April 14, 1925.
F. C. CHAPMAN
1,533,388
DEHYDRATOR FOR NUTS AND THE LIKE
Filed April 7, 1924   3 Sheets-Sheet 1
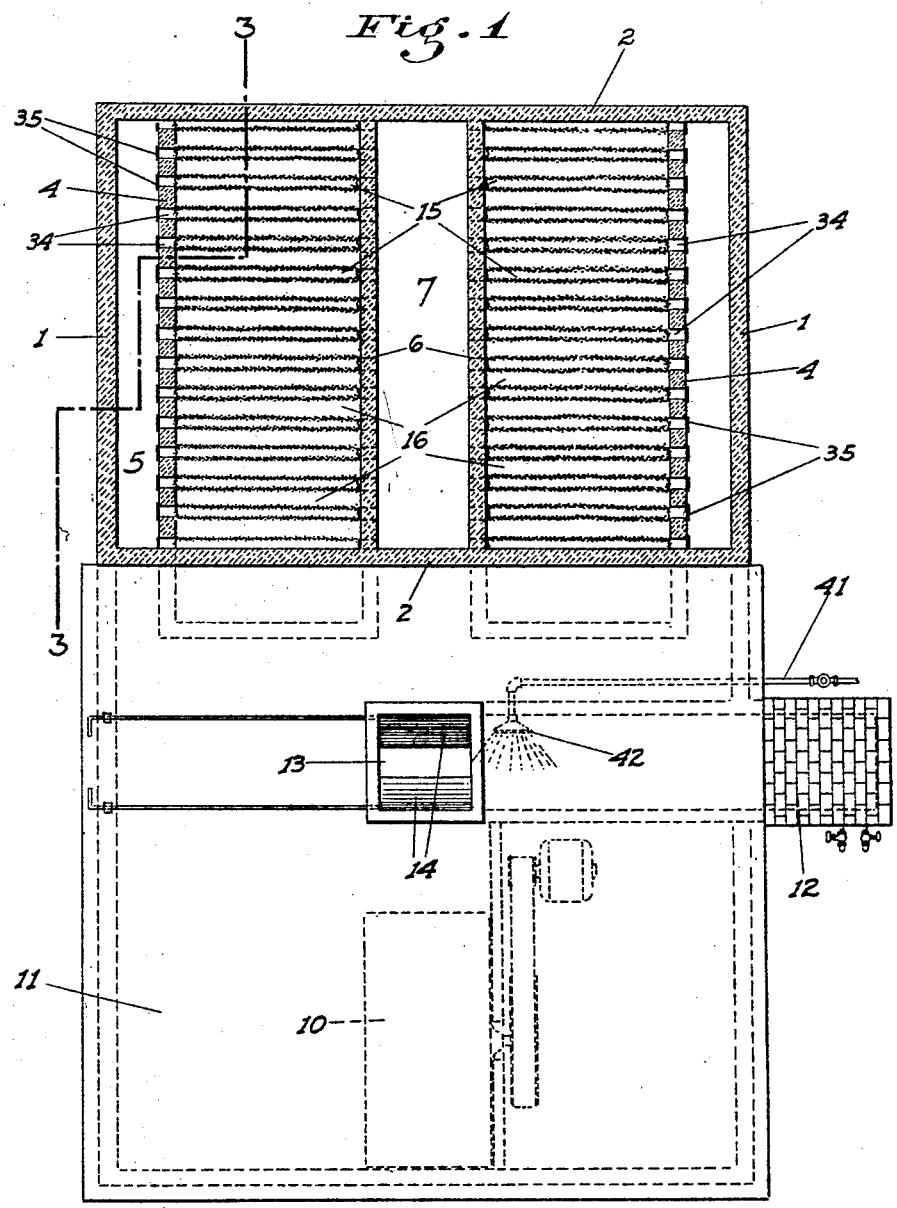
INVENTOR
Frank C. Chapman
BY
ATTORNEY

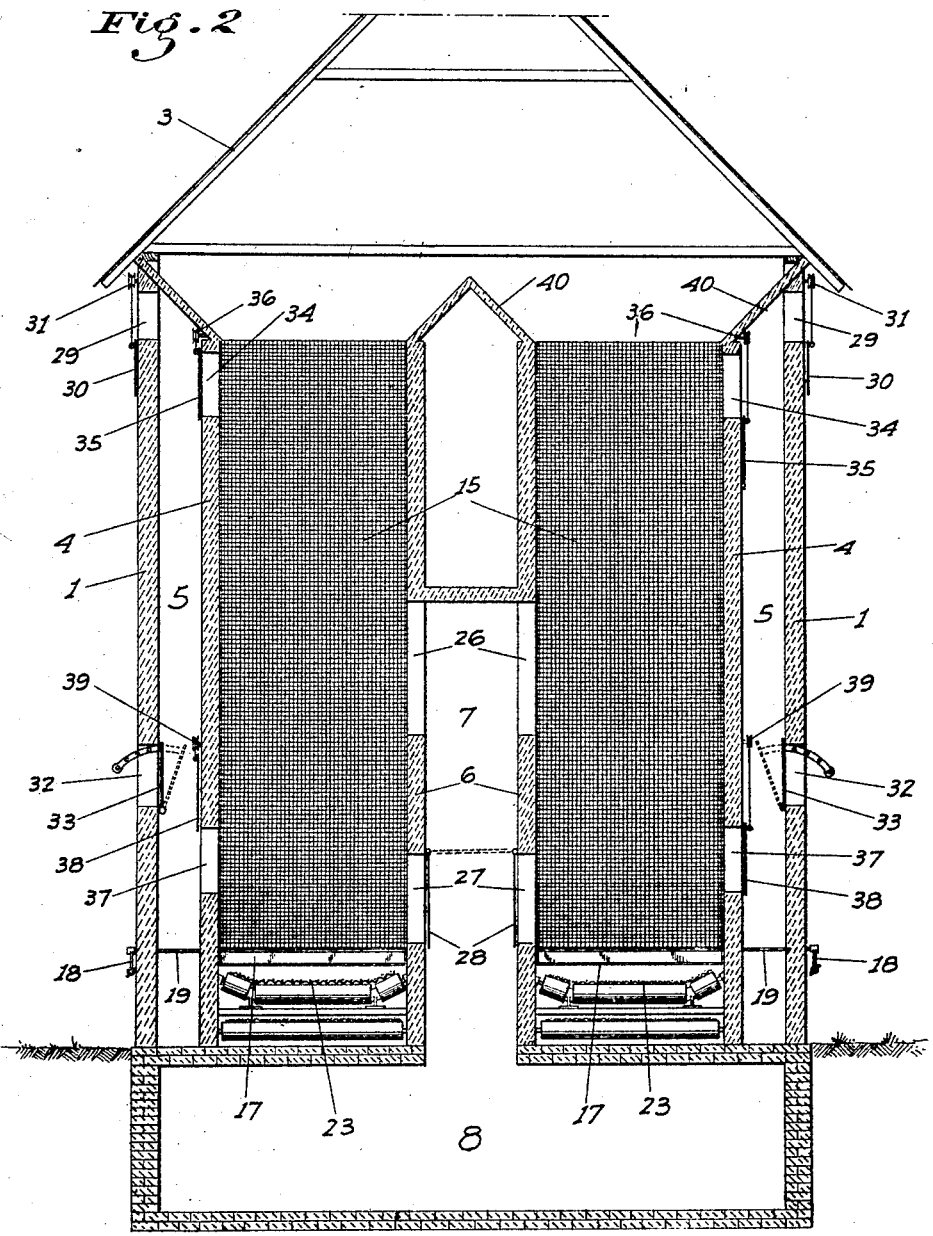

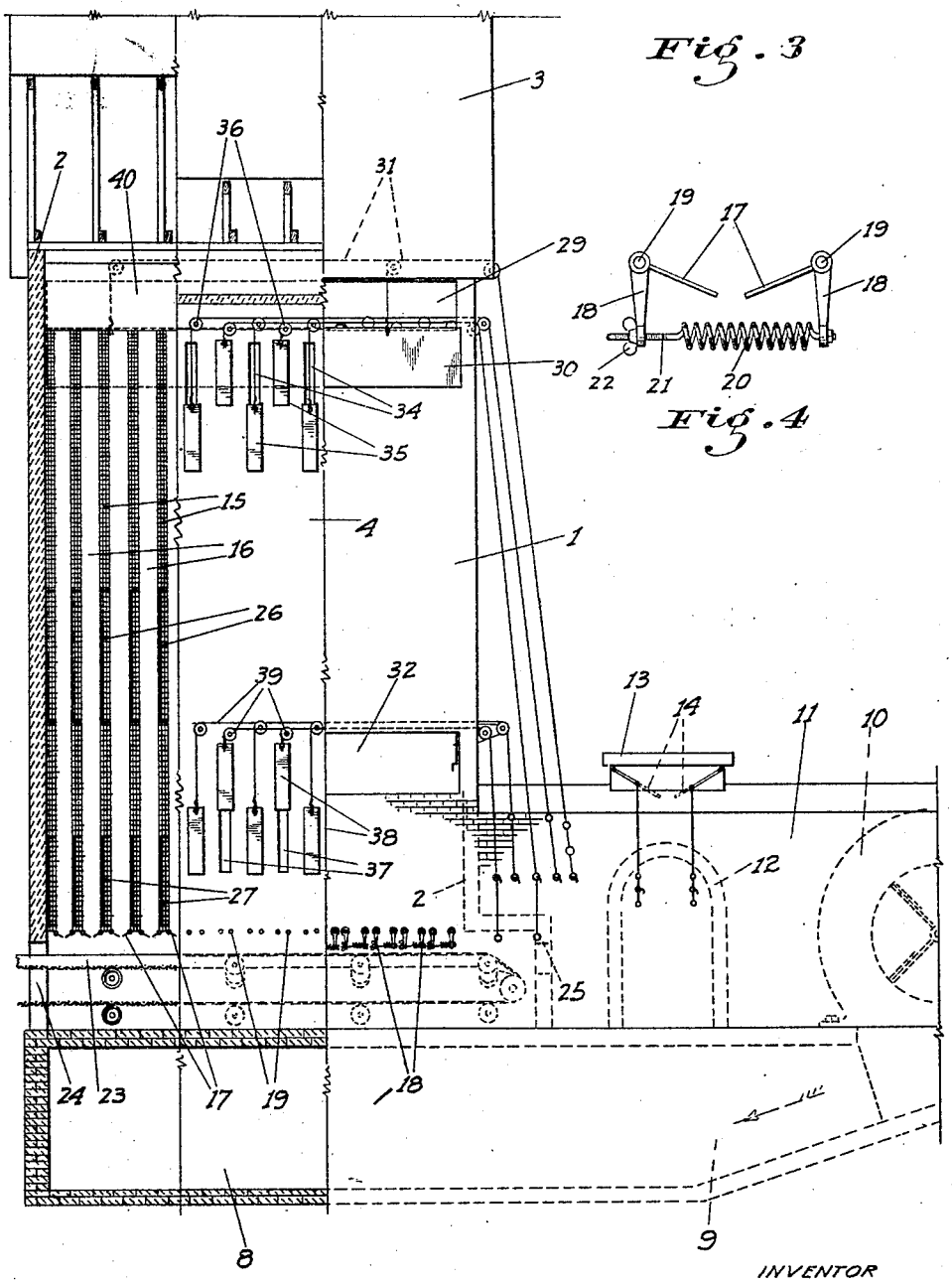

Patented Apr. 14, 1925.

1,533,388

UNITED STATES PATENT OFFICE.

FRANK C. CHAPMAN, OF MODESTO, CALIFORNIA.

DEHYDRATOR FOR NUTS AND THE LIKE.

Application filed April 7, 1924. Serial No. 704,688.

*To all whom it may concern:*

Be it known that I, FRANK C. CHAPMAN, a citizen of the United States, residing at Modesto, county of Stanislaus, State of California, have invented certain new and useful Improvements in Dehydrators for Nuts and the like; and I do declare the following to be a full, clear, and exact description of the same, reference being had to the accompanying drawings, and to the characters of reference marked thereon, which form a part of this application.

This invention relates to improvements in dehydrators, and particularly to a type especially designed to dry nuts and other products such as beans, corn, half dry prunes, quartered apples and the like, cocoa beans, sand, rock, ore, etc.

The principal object of my invention is to construct the dehydrator in such a manner that the stuff being dried is carried in a number of vertical bins all disposed in a common horizontal plane and separated by air passages, and arranging for the drying air to pass through the passages and bins in any one of a variety of directions as may be desired by the operator.

The advantages of this arrangement are many. In the first place, a complete circulation of air through the produce being dried is had especially as the direction of flow of the air may be changed or reversed at any time at the will of the operator.

In the second place, the produce being in vertical bins instead of the usual horizontal trays, the produce may move from the upper to the lower ends of the bins (which are the drying chambers) by gravity, doing away with hand labor or power means for advancing the produce.

With this type of dehydrator the article to be dried enters at the cool end or top into air of low temperature and great humidity. This condition is caused by the temperature of the air falling as it passes through the articles being dried, the moisture which is taken out from the latter going into the air, which of course gains in humidity.

The results are that low temperature and high humidity of the air are obtained both at top and bottom of the drying chambers. At the same time high temperature and low humidity of the air is had at the center, where the air from the pressure fan enters the drying chamber. It is apparent, however, that the article at the center part of the dehydrator can stand a much higher temperature without danger than at the income end or the discharge end, the products in that zone being already half dried.

If hot dry air comes in contact with the article being dried and all of the moisture has been removed it will burn. With my apparatus, however, low temperature and high humidity of the air is had at the finishing end, as previously stated, and no damage can be done.

Another object of my invention is to provide a common conveyor for each set of bins to carry away the dried nuts as they move to the bottom of the bins, and to provide for a stream of cool air to pass over the dried and heated product as it lies on the conveyor, thereby cooling the same.

This cool air will not reduce the efficiency of the drying process, since when the produce is on the conveyor it is clear of the drying chambers or bins.

The hot or drying air flow is so passed into the drying bins in which the produce is located that the latter will be quickly and efficiently dried without the danger of any of the produce being unduly dried out or burned during the drying process.

The particular manner in which these and other objects are attained will be more fully seen in the description following, taken in connection with the accompanying drawings which illustrate a dehydrator constructed according to my invention.

On the drawings similar characters of reference indicate corresponding parts in the several views:

Fig. 1 is a sectional plan of the dehydrator.

Fig. 2 is a typical cross section of the apparatus.

Fig. 3 is a longitudinal elevation, taken through different transverse planes, as on the line 3—3 of Fig. 1.

Fig. 4 is a detached view of a pair of bin gates and a control means therefor.

Referring now more particularly to the characters of reference marked on the drawings, the numeral 1 denotes the outer side walls and 2 the end walls of the dehydrator, supporting a suitable roofing 3. Inwardly of the side walls 1 and parallel thereto are inner walls 4, extending the full length and height of the walls 1, and enclosing with said walls and the end walls 2 air flues 5. Centrally of the dehydrator between said walls 4 and extending the full length and height thereof are additionally transversely spaced walls 6, forming a vertical flue 7 therebetween, which however, is blocked off at a point a little more than half way up from said walls 6, as shown in Fig. 2. This air flue 7 connects throughout its length with a hot air pit 8 below the walls 6, which pit in turn communicates with a tunnel 9 leading from the discharge of a pressure fan 10. The intake of the fan is open to a furnace room 11 separated from the tunnel, and with which the lower ends of the flues 5 communicate. A furnace 12, preferably of the type shown in my Patent No. 1,422,416, dated July 11th, 1922, discharges into this room, and an air intake 13, open to the atmosphere and provided with suitable gate or damper means 14 is located in the roof of the furnace room, preferably just ahead of the inner end or mouth of the furnace, so that the air being drawn through said intake by the suction of the fan will be immediately subjected to the heating influence of the furnace.

Positioned between corresponding pairs of walls 4 and 6 and extending from the top to a point short of the bottom thereof are hollow vertical partitions 15 of suitable width having foraminous walls to admit of a free passage of air therethrough, the perforations or openings in said walls not being large enough however to allow of the passage of any produce being dried to pass therethrough. These partitions are spaced apart lengthwise of the walls, leaving a plurality of separated vertical compartments or bins 16 therebetween, each of which is bounded by the walls 4 and 6 and by adjacent walls of adjacent partitions.

The bins, which receive the produce to be dried at their upper ends, are freely open both at top and bottom, but the size of the opening at the lower end is regulated by means of transversely extending gates 17. (See Figs. 3 and 4.) There are preferably two such gates for each bin, and they are arranged to spread apart from each other with a downward movement. Various means may be employed for controlling the movement or setting of the gates. In the present instance I have shown a form of control or connecting structure between the gates by reason of which the width of the opening between the gates will depend both upon the weight of the produce in the bins and upon hand adjustment of said means. This structure comprises vertical arms 18 connected, outside the walls 1, to the pivotal or hinge shafts 19 of the gates and depending downwardly therefrom. A tension spring 20 is attached at one end to one of said arms and is provided at its other end with a threaded stem 21 which passes freely through the other arm and has an adjusting nut 22 thereon bearing against said arm. By this means the tension of the spring which tends to hold the gates closed, may be adjusted by an operator at will, and consequently the extent to which the gates will be opened by the weight of the produce in the bin, may be varied to suit. Thus if it is desired that the produce shall discharge slowly, the spring is tightened up, and loosened if a rapid discharge is wanted or when the bin is becoming empty.

The tension of the spring however is sufficient to close the gates under any condition when the bin is entirely empty, thus preventing hot air from being blown therethrough if the dehydrator is being operated with only some of the bins in service.

This specific structure however is not essential, since the gates may be opened and closed by hand, or provided with counterweight, lever control or other means as may be found desirable. Positioned under each row of bins, that is between the corresponding walls 4 and 6 on each side of the central hot air flue 7, is an endless conveyor 23 preferably of the belt type, driven by any suitable means so that the upper run of said belt travels away from the furnace end of the dehydrator.

This belt extends beyond the dehydrator at the end opposite the furnace through an opening 24 in the adjacent end wall 2. Since there is also an opening 25 through the other wall 2 into the furnace room in the plane of the conveyor, the suction of the fan will cause a blast of cool air to be drawn along the conveyor from outside the dehydrator, thus cooling the nuts or other produce after they drop onto said conveyor after being subjected to the heated air within the bins.

Cut through the walls 6 at the top of the flue 7 are vertical air passages 26 communicating with the different partitions 15 between the bins. Similarly disposed passages 27 are also cut through the walls 6 adjacent the lower ends of the partitions.

Gates or dampers 28 are hinged to the adjacent faces of the walls 6 above the passages 27, and extend the full length of the flue 7, being arranged to be moved to a vertical position to close said passages, or to a horizontal position to shut off the flue 7 and passages 26 from the intake pit 8. It will thus be seen that the air from said pit may be caused to pass through the passages 26 while shutting it off from passages 27, or vice versa; or if desired some air may pass at the same time through both sets of passages, by suitably adjusting the dampers.

Openings 29 are cut through the outer walls 1 at the top and for the full length thereof. Dampers 30, preferably vertically slidable, are mounted in connection with these openings, and are manipulated from the ground as may be required, by suitable means, as for instance a pulley and cord arrangement as illustrated at 31.

Openings 32 of similar size and arrangement are also cut through the walls 1 a considerable distance below the openings 29, adjustable deflector plates 33 being mounted in connection with the openings 32 on the inside of the walls 1 and when opened, slope upwardly into the flue space 5 from the lower end of the openings which they control.

Cut through the walls 4 adjacent the upper ends thereof and in alinement with the partitions 15 are vertical passages 34 having vertically slidable dampers 35 arranged in connection therewith. These dampers are preferably arranged so that alternate passages are closed while the others are open, and to enable this arrangement to be readily had and reversed when desired, the alternate sets of dampers are connected in common to independent pulley and cord arrangements operable from the ground, as shown at 36.

Similarly arranged vertical passages 37 are cut through the walls 4 in a vertical plane preferably somewhat below that of the outer-wall openings 32. Sliding dampers 38 control the passages 37, these dampers being preferably disposed in alternate open and closed positions as are the dampers 35.

The alternate sets of dampers are therefore likewise connected to common but independent cord and pulley control means as at 39.

In operation, before passing any hot air into the bins, the latter are filled from the top by any suitable means, and kept filled as long as the supply of nuts or the like to be dried, holds out.

As an aid in filling the bins and insuring that all the nuts etc. will be deflected thereinto, the walls 4 and 6 above the bins have outwardly flaring extensions 40, thereby forming a single hopper for each set of bins.

The gate control means are adjusted to hold the discharge gates 17 closed for the time being, the passages 27 opened and passages 26 shut off and all the passages 37 are closed, while passages or outlets 34 are alternately open and closed, as previously described. The outlets 29 and 32 may be opened or not, depending on the condition of the air (as to humidity etc.) after it has passed through the bins. If the upper outlets 29 are open, the moist air after passing through the nuts and outlet (which are at the wet end of the bins) will for the most part pass out into the atmosphere through said outlets 29. If the lower outlets 32 are open, any moist air coming down the flue 5 will be deflected through said outlets by the plates 33.

The furnace is then started up until an air temperature of about 80° F. has been imparted to the air in the furnace room. The fan is then set in operation, causing this heated air to be discharged under pressure into the pit 8, from which it will pass into the flue 7 and thence into the hollow and perforated partitions 15 through the lower intake passages 27. The air may not only freely pass from the partitions into the bins but also through the nuts filling the bins, since the nuts are loose and the air can easily circulate therebetween. The dry heated air will thus act first on the lowest layers of the nuts and will circulate up to the tops of the bins to reach the outlets 34. As the air rises it gathers moisture, so that when the outlets are reached, the air has of course lost considerable of its drying capacity, as well as some of its heat. It will be noted that I do not depend for the air circulation upon the natural tendency of heated air to rise, but a positive and continuous circulation is maintained by reason of the pressure fan which is preferably of large capacity so as to provide a heavy flow of air, and which blows the heated air through the bins and draws said air back to the furnace room by reason of the suction of the fan connected with the return flues 5 leading to said room and in which the intake of the fan is located.

The hot air is passed into the bins through the intakes 27 for a certain length of time. the furnace being gradually fired up until the air in the furnace room reaches a temperature of about 110°, which is about the maximum used for drying nuts.

When the lowest layers of the nuts are thoroughly dried, the dampers 28 are moved to shut off the lower intakes 27 and allow the air in the flue 7 to pass to the upper intakes 26. At the same time the bin gates 17 are permitted to open to let the lowest and dried nuts fall onto the conveyor 23, which is then caused to travel at a predetermined speed, so as to carry the finished nuts out of the dehydrator where they may be sacked or boxed as may be desired. The alternate ones of the lower outlets 37 are also opened. The dry heated air, at its maximum temperature is thus fed into the bins at about the center of height thereof, causing the nuts to be quickly dried. This heat however will not now cause the nuts to burn or be harmed in any way, since said nuts have been slowly moved down from the zone of the low temperature and humid air to the zone of air which has the maximum temperature required and the lowest amount of humidity, which causes the nuts to dry without damage, as they are already half dried, and thus thoroughly prepared for the high temperature at the center of the drier.

Since certain ones of both upper and lower outlets 34 and 37 are now open, the flow of air, due to the pressure from and the suctional influence of the fan in the return flues 5, will be branched, some of the air circulating through the strata of nuts above the intakes 26, and some of it circulating through the strata of nuts below said intakes, but passing out through the outlets 37.

By alternately closing and opening the dampers 35 and 38 the air flow across the nuts in the bins is reversed. Since the air cannot pass freely into the flue 5 through certain of the passages 15, the back pressure caused from the pressure fan will force the air through the nuts crosswise of the bins all the way from top to bottom thereof as well as flowing up into passages 15 whose outlets are open, since the suction of the fan through said open passages will help pull the air through to the flue 5.

By reversing or changing the position of these dampers the air will be caused to flow the other way across the nuts and into the flue 5. By thus changing the direction of the air flow the time of drying is very much shortened, as every nut is acted on by the air.

As the nuts drop from the bins, their place is taken by undried nuts with which the bins are kept filled from above, so that the nuts, in different stages of drying, will be gradually and evenly moved from the upper to the lower ends of the bins by gravity, thereby insuring that all the nuts are subjected to the same degree of drying and for the same length of time.

A structure with the same air control means as the above may also be of value in curing certain products which should be subjected to a humidifying rather than a drying process. In such cases, a water pipe 41 is provided which has a spray nozzle 42 at its inner end projecting into the furnace adjacent the mouth thereof so that a water spray issuing from the nozzle is turned into steam by the hot outcoming furnace gases, which steam will be absorbed by the air in the furnace room and cause the same to be humidified, the degree to which this may be carried out depending on proper manipulation of the fresh air intake dampers and the volume of water passed through the nozzle, regardless of temperature.

I have shown the dehydrator built double, or with duplicate sets of bins, conveyors, etc. with a common central hot air flue. It will be evident however that one set of bins and the accompanying parts may be omitted, and the dehydrator built with a single row of bins, with the hot air intake on one side and a return flue on the other, just as shown herein.

Also, while I have shown the bins as being disposed in a definite vertical plane, they may be set at any transverse or longitudinal angle desired as long as the gravity feed of the produce in the bins is not interfered with.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A dehydrator including a plurality of vertical bins arranged in parallel and spaced relation, and means for passing air through said bins from bottom to top thereof, and also alternately from a point centrally of the height thereof to both the upper and lower ends.

2. A dehydrator including a plurality of vertical bins arranged in parallel and spaced relation, and means for passing air through said bins from a point on one side substantially centrally of the height thereof to the opposite side at both the upper and lower ends thereof.

3. A dehydrator including vertical and horizontally spaced hot air intake and return flues, vertical bins spaced longitudinally of the flues disposed therebetween and means for passing heated air vertically through the bins from the intake to the return flue.

4. A dehydrator including vertical and horizontally spaced hot air intake and return flues, vertical bins spaced longitudinally of the flues disposed therebetween and means for passing heated air vertically through the bins from the intake at a point substantially half way up the bins to the return flue adjacent both the upper and lower ends of the bins.

5. A dehydrator including vertical and horizontally spaced hot air intake and return flues, vertical bins spaced longitudinally of the flues disposed therebetween and means for passing heated air vertically through the bins from the intake at a point substantially half way up the bins to the return flue adjacent both the upper and lower ends of the bins, and alternately from the intake adjacent the lower end of the bins to the return flue adjacent the upper end of the bins.

6. A dehydrator including vertical and horizontally spaced hot air intake and return flues, vertical bins spaced longitudinally of the flues disposed therebetween and means for passing heated air vertically through all the bins in common from the intake to the return flue.

7. A dehydrator including a vertical and horizontally spaced hot air intake and return flues respectively, vertical bins spaced longitudinally of the flues disposed therebetween and means for passing heated air vertically through the bins from the intake to the return flue, and throughout the height and width of the bins.

8. A dehydrator including vertical and horizontally spaced hot air intake and return flues, vertical hollow partitions spaced longitudinally of the flues positioned therebetween the spacing between the partitions forming bins for the reception of the produce to be dehydrated, and the partitions having foraminous walls, intake passages leading to the partitions from the intake flue, and outlet passages leading from said partitions to the return flue.

9. A dehydrator including vertical and horizontally spaced hot air intake and return flues, vertical hollow partitions spaced longitudinally of the flues positioned therebetween the spacing between the partitions forming bins for the reception of the produce to be dehydrated, and the partitions having foraminous walls, intake passages leading to the partitions from the intake flue, said passages being in vertically spaced sets, outlet passages leading from the partitions to the return flue, and means whereby heated air may pass through either at a time of the sets of intake passages.

10. A dehydrator including vertical and horizontally spaced hot air intake and return flues, vertical hollow partitions spaced longitudinally of the flues positioned therebetween the spacing between the partitions forming bins for the reception of the produce to be dehydrated, and the partitions having foraminous walls, intake passages leading to the partitions from the intake flue, said passages being in vertically spaced sets, outlet passages leading from the partitions to the return flue, and a common damper structure for both sides of intake passages arranged to close one set and open the other alternately, to prevent or allow of the passage of air therethrough from the intake flue.

11. A dehydrator including vertical and horizontally spaced hot air intake and return flues, vertical hollow partitions spaced longitudinally of the flues positioned therebetween the spacing between the partitions forming bins for the reception of the produce to be dehydrated, and the partitions having foraminous walls, intake passages leading to the partitions from the intake, flue, and vertically spaced sets of outlet passages leading from the partitions to the return flue.

12. A dehydrator including vertical and horizontally spaced hot air intake and return flues, vertical hollow partitions spaced longitudinally of the flues positioned therebetween, the spacing between the partitions forming bins for the reception of the produce to be dehydrated, and the partitions having foraminous walls, intake passages leading to the partitions from the intake flue, and vertically spaced sets of outlet passages leading from the partitions to the return flue, and independently controlled damper means for said sets of outlets.

13. A dehydrator including vertical and horizontally spaced hot air intake and return flues, vertical hollow partitions spaced longitudinally of the flues positioned therebetween, the spacing between the partitions forming bins for the reception of the produce to be dehydrated, and the partitions having foraminous walls, intake passages leading to the partitions from the intake flue, outlet passages leading from the partitions to the return flue, and damper means for said passages adapted to be set in alternate and reversible open and closed positions.

14. A dehydrator including a row of vertical bins arranged in parallel and spaced relation, means for passing air through the bins diagonally from bottom to top thereof both transversely and longitudinally of the row, and means whereby the direction of travel of the air longitudinally of the row may be reversed at will.

15. A dehydrator including a row of vertical bins arranged in parallel and spaced relation, a common horizontal conveyor for all said bins positioned thereunder, and onto which the dried and heated produce from the bins passes, and means for cooling said produce while on the conveyor.

16. A dehydrator including a row of vertical bins arranged in parallel and spaced relation, and a common horizontal conveyor for all said bins positioned thereunder, and onto which the dried and heated produce from the bins passes, side walls enclosing the conveyor, but open to the atmosphere at one end, a hot air room, and a suction fan whose intake connects with said room, the conveyor enclosure opening into said room at its end opposite to the first named open end, whereby with the operation of the fan a draft of air from outside the dehydrator will be drawn along the conveyor.

17. A dehydrator including a drying chamber, a hot air room, an open mouthed furnace projecting into said room, and a water-spray nozzle projecting into the furnace adjacent the mouth thereof.

18. A dehydrator including a drying chamber, a hot air room, an open mouthed furnace projecting into said room, and means whereby the air in said room as it becomes heated may be caused to attain any desired degree of humidity.

19. A dehydrator including a bin to receive the produce to be dried, and means for passing air through said bin from one end to the other thereof, and also alternately from a point centrally of the length of the bin to both ends thereof.

20. A dehydrator including transversely spaced hot air intake and return flues, bins spaced longitudinally of the flues disposed therebetween, and means for passing heated air through the bins from the intake to the return flue.

In testimony whereof I affix my signature.

FRANK C. CHAPMAN.

Witness:
OLIVER L. CHAPMAN.